US010116327B2

(12) United States Patent
Cutter et al.

(10) Patent No.: US 10,116,327 B2
(45) Date of Patent: Oct. 30, 2018

(54) TECHNOLOGIES FOR EFFICIENTLY COMPRESSING DATA WITH MULTIPLE HASH TABLES

(71) Applicant: Intel Corporation, Santa Clara, CA (US)

(72) Inventors: Daniel F. Cutter, Maynard, MA (US); Vinodh Gopal, Westborough, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/638,842

(22) Filed: Jun. 30, 2017

(65) Prior Publication Data

US 2018/0026652 A1     Jan. 25, 2018

Related U.S. Application Data

(60) Provisional application No. 62/365,969, filed on Jul. 22, 2016, provisional application No. 62/376,859, filed on Aug. 18, 2016, provisional application No. 62/427,268, filed on Nov. 29, 2016.

(51) Int. Cl.
*H03M 7/30* (2006.01)
*G06F 17/30* (2006.01)

(52) U.S. Cl.
CPC .... *H03M 7/3084* (2013.01); *G06F 17/30949* (2013.01)

(58) Field of Classification Search
None
See application file for complete search history.

(56) References Cited

U.S. PATENT DOCUMENTS

| 6,226,628 | B1 * | 5/2001 | Forbes | H03M 7/3084 707/693 |
| 7,398,278 | B2 * | 7/2008 | Cadambi | H04L 29/12801 |
| 2015/0098470 | A1 * | 4/2015 | Sun | H04L 45/7453 370/392 |
| 2017/0187624 | A1 * | 6/2017 | Goel | H04L 45/748 |

OTHER PUBLICATIONS

David A. Huffman, "A Method for the Construction of Minimum-Redundancy Codes", Proceedings of the I.R.E., Sep. 1952, pp. 1098-1011.
"RFC 1951—DEFLATE Compressed Data Format Specification version", downloaded from http://www.faqs.org/rfcs/rfc1951.html, RFC 1951, 15 pages.
Ziv et al., "A Universal Algorithm for Sequential Data Compression", IEEE Transactions on Infoirmation Theory, col. IT-23, No. 3, May 1977, pp. 337-343.

* cited by examiner

*Primary Examiner* — Howard Williams
(74) *Attorney, Agent, or Firm* — Barnes & Thornburg LLP

(57) ABSTRACT

Technologies for compressing data with multiple hash tables include a compute device. The compute device is to produce, for each of multiple string prefixes of different string prefix sizes, an associated hash. Each string prefix defines a set of consecutive symbols in a string that starts at a present position in an input stream of symbols. The compute device is also to write, to a different hash table for each string prefix size, a pointer to the present position in association with the associated hash. Each hash is usable as an index into the associated hash table to provide the present position of the string.

25 Claims, 17 Drawing Sheets

TECHNOLOGIES FOR EFFICIENTLY COMPRESSING DATA WITH MULTIPLE HASH TABLES

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Compression schemes, such as Lempel-Ziv based compression schemes, are often used in data centers to compress data, thereby enabling compute devices in the data center to store more customer data in a given amount of data storage capacity and/or transmit more customer data in a given amount of network bandwidth. When compressing data pursuant to a Lempel-Ziv based scheme, the compute device searches for the longest string from a history buffer (e.g., a sliding window of previous data from an input stream) that matches a string starting at the present position in the input stream (e.g., a number of bytes into the input stream). To do so, the compute device typically produces a hash by performing a hashing function on a prefix of a string of symbols (e.g., each a byte or other unit of data) starting at a present position and including a predefined number of additional symbols from the input stream. In typical systems, the total length of the prefix is three symbols. Typical systems then use the resulting hash as an index into a hash table that includes, for each hash, a set of pointers that point to other strings in the history buffer that produced the same hash.

The compute device, in typical compression systems, then compares one or more of the strings associated with the pointers found in the hash table to the string at the present position to find one or more matches, and selects the longest matching string. The compute device then replaces the symbols in the string at the present position with a much shorter reference back to the earlier occurrence of the string, to produce compressed output data. However, given that only three symbols are used as the prefix size, the set of pointers that refer to other strings in the history buffer that produced the same hash can be relatively long. As such, to improve the chances of finding a long string that matches (e.g., has the same sequence of symbols) the string at the present position, and thereby obtain a relatively high compression ratio, the compute device may be required to search through many (e.g., a hundred or more) pointers and compare each referenced string to the present string for a potential match, incurring significant latency in producing the compressed output data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
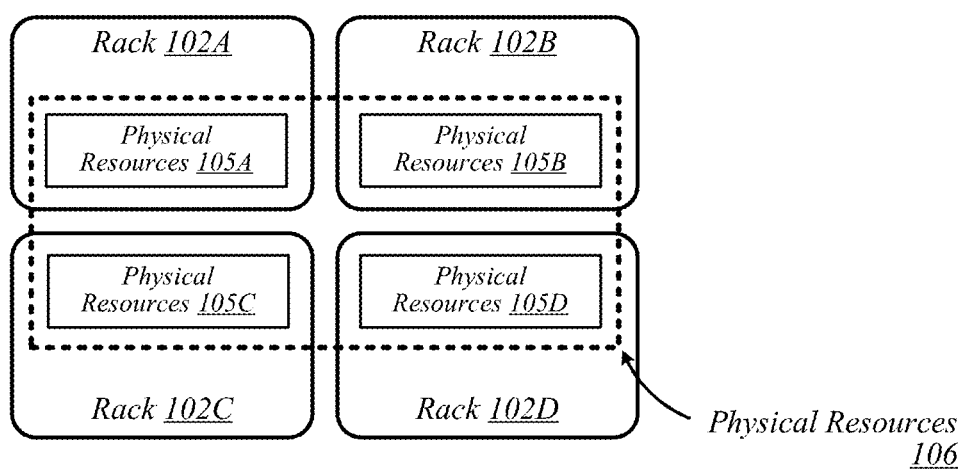
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. In the present description, near memory may be embodied as any memory, such as volatile memory, coupled to the host central processing unit via a high bandwidth, low latency connection for efficient processing while far memory may be embodied as any memory, such as volatile or nonvolatile memory storage, that is larger and slower than the near memory, and is typically coupled to the central processing unit via a comparatively lower bandwidth and/or higher latency connection. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low-latency interconnections and network architecture, the data center 100 may, in use, pool resources, such as memory, accelerators (e.g., graphics accelerators, FPGAs, application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
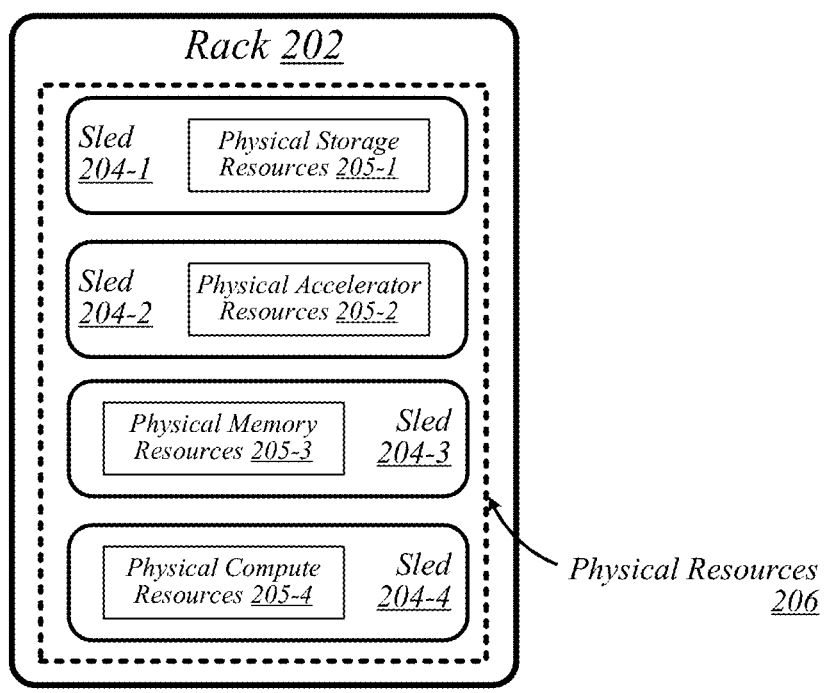
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
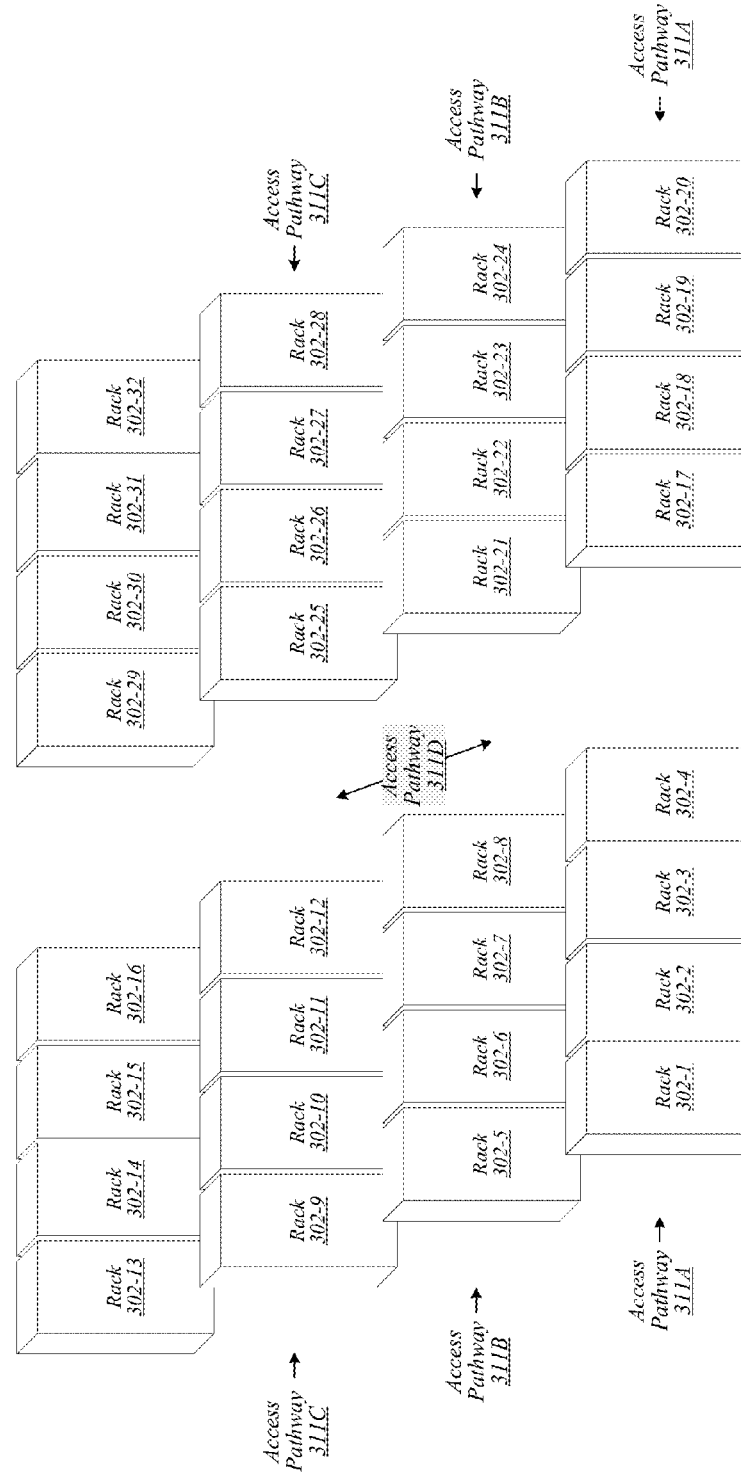
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
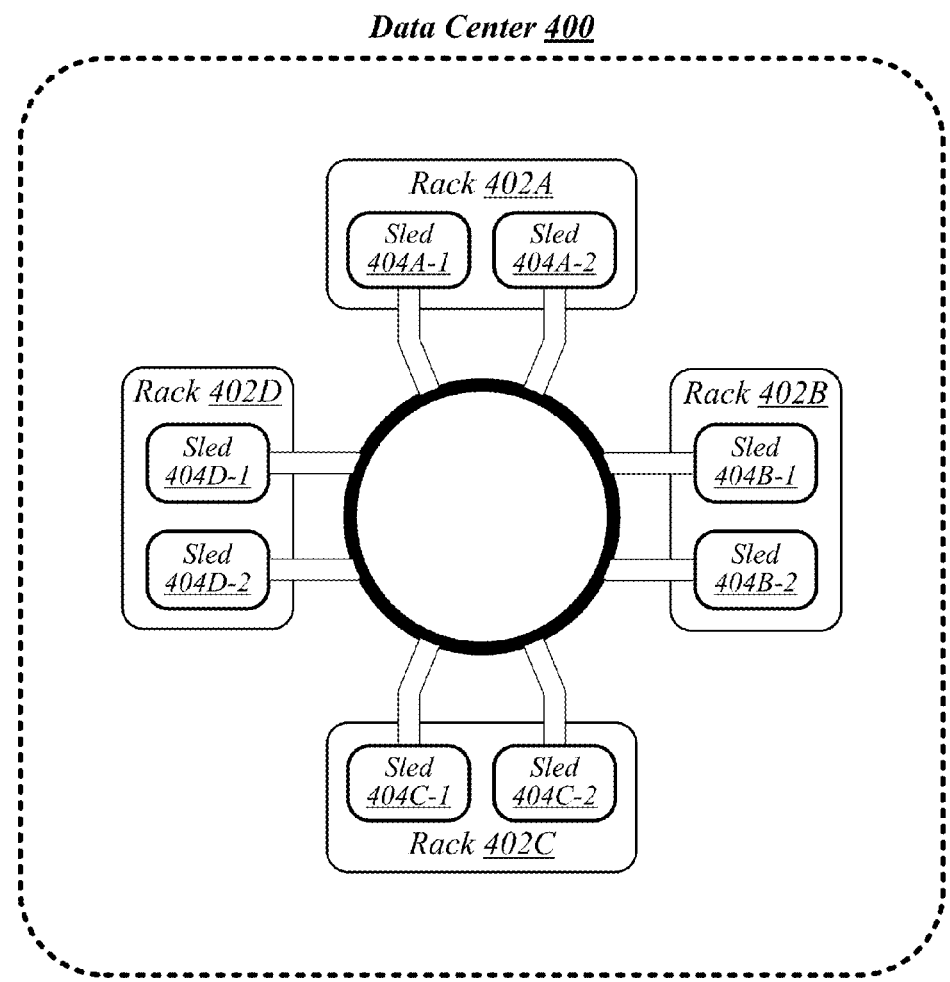
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
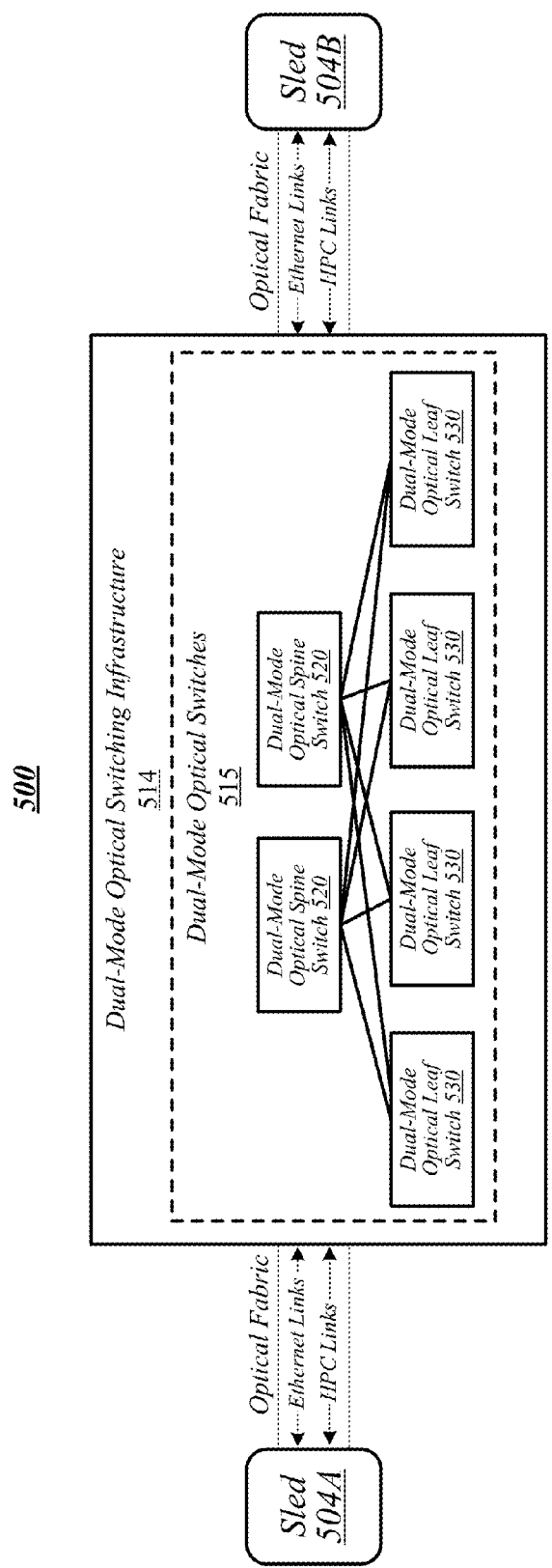
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
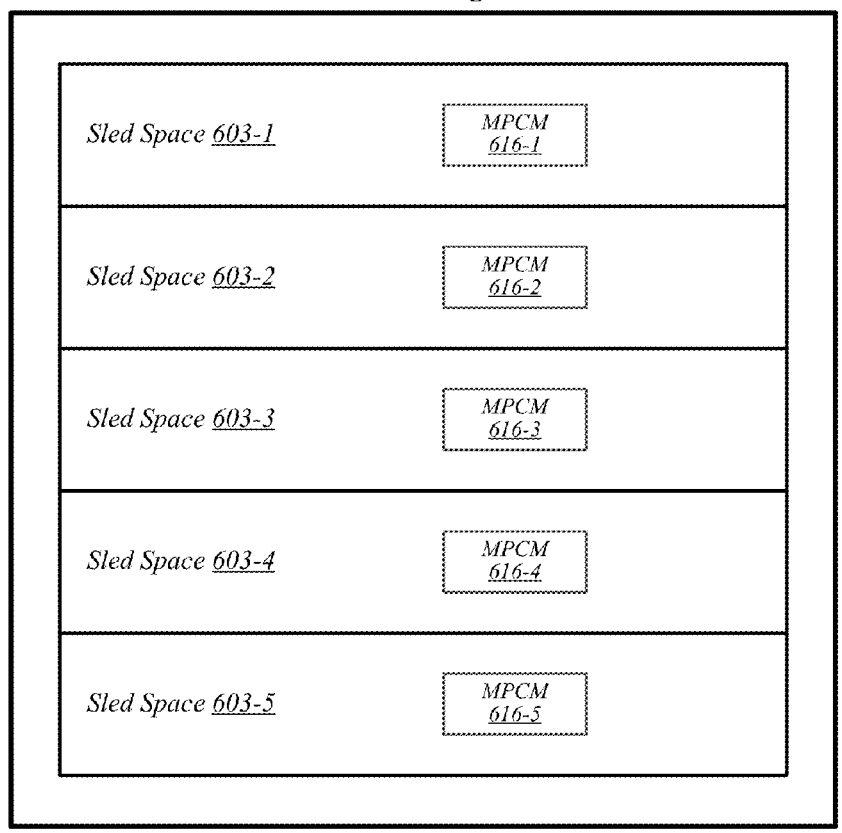
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
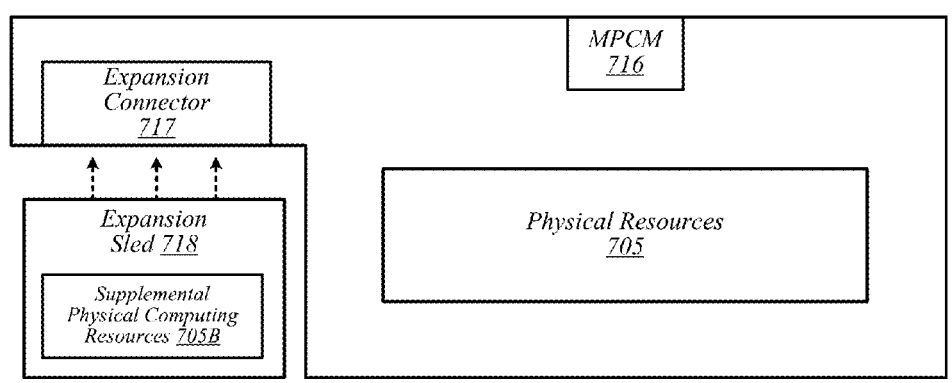
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
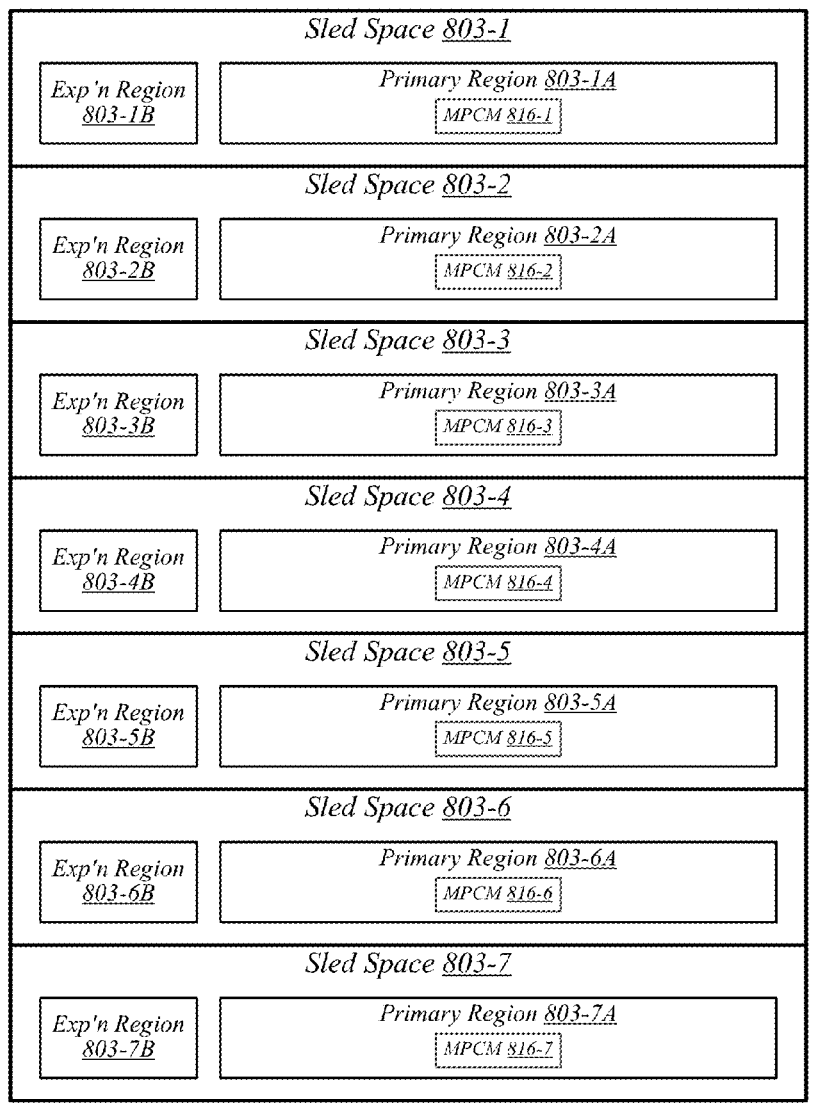
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
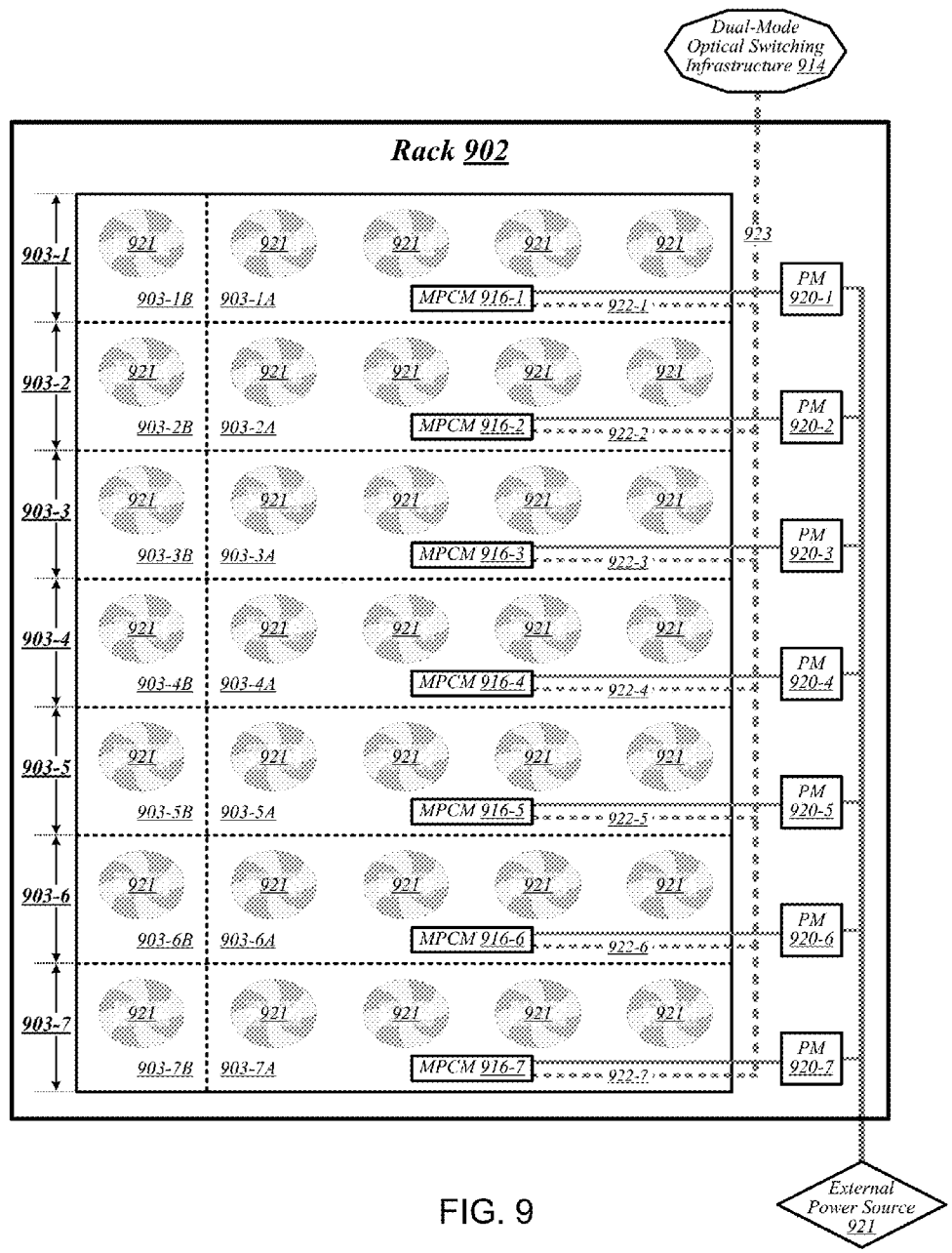
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
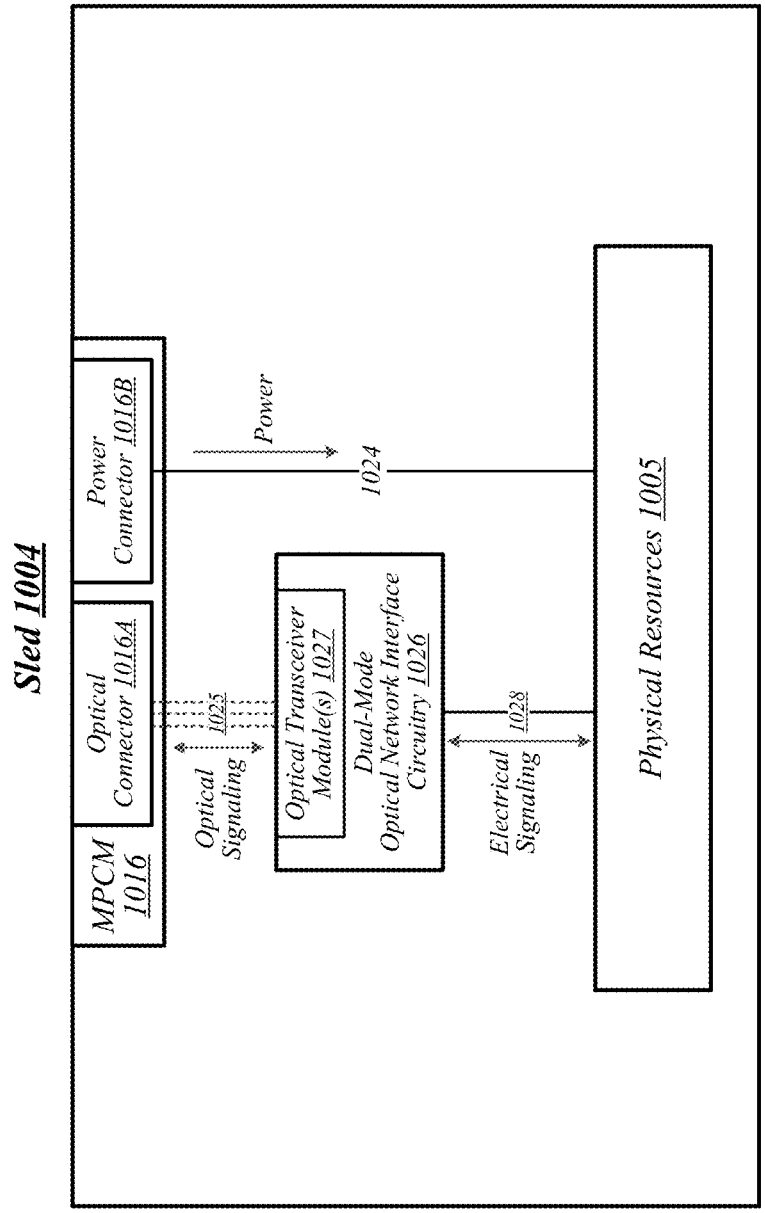
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
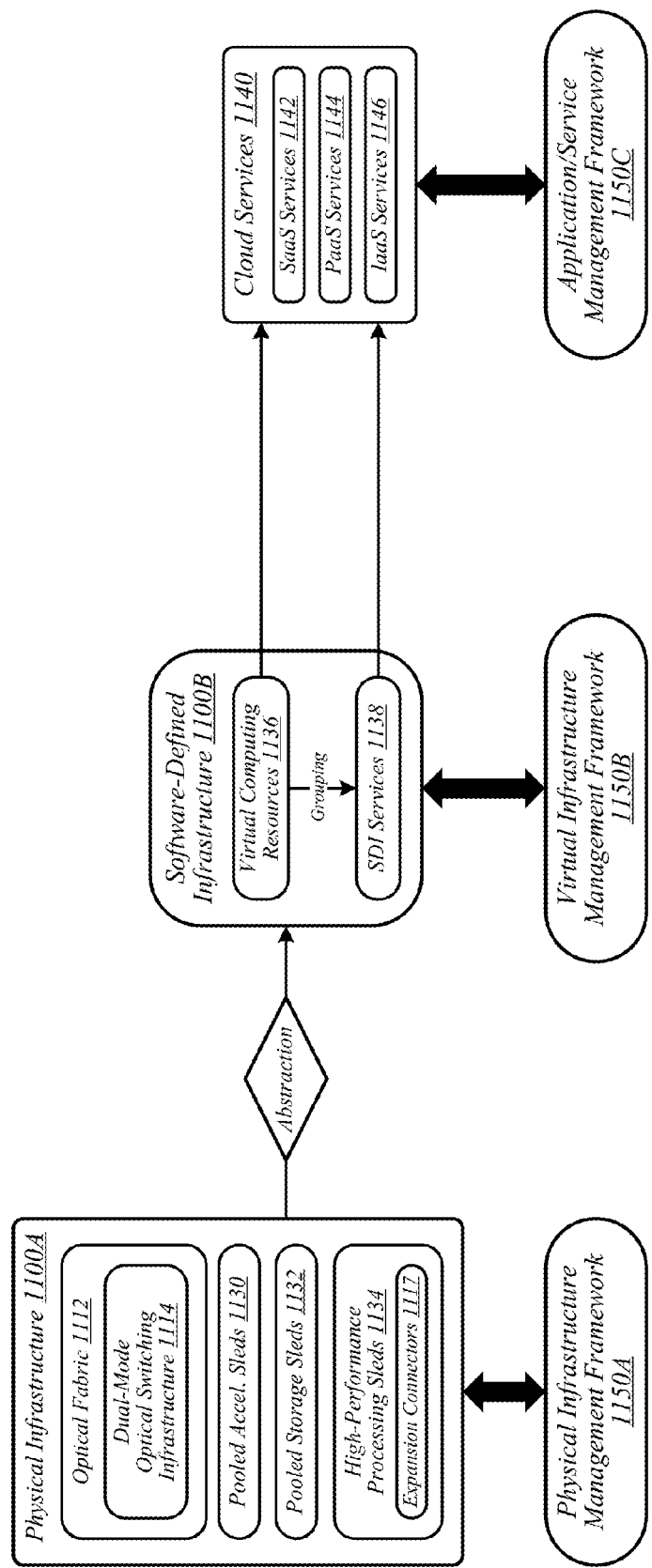
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs) (e.g., a controller coupled to a non-volatile memory chip, such as NAND, and an interface to a host device). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a memory expansion sled, such that the memory that is locally available to that high-performance processing sled 1134 is disaggregated from the processors and memory comprised on that sled. In some embodiments, such a high-performance processing sled 1134 may be configured with memory using an expansion sled that comprises a low-latency SSD. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of software-defined infrastructure (SDI) services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
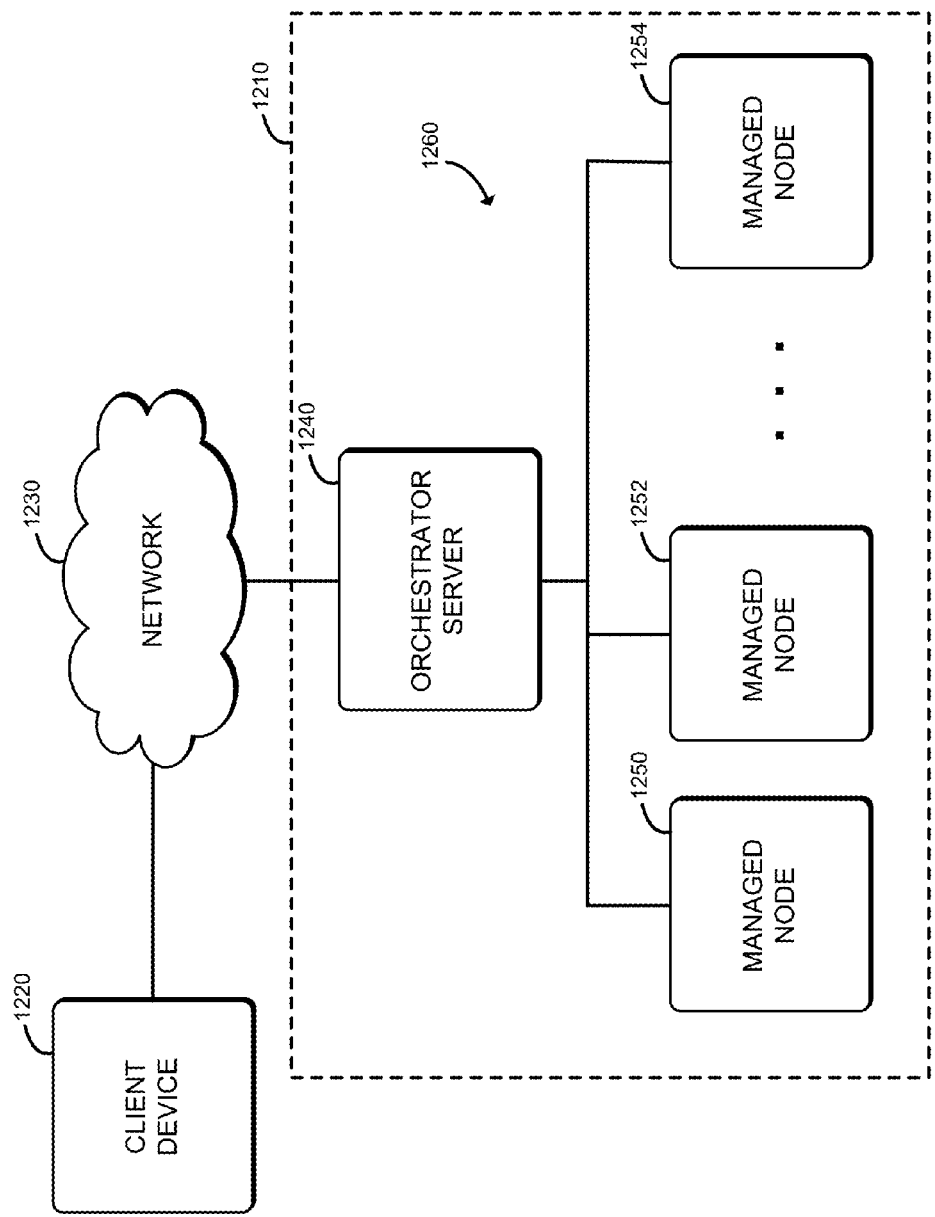
FIG. 12 is a simplified block diagram of at least one embodiment of a system for efficiently compressing data with multiple hash tables.

As shown in FIG. 12, an illustrative system 1210 may be implemented in accordance with the data centers 100, 300, 400, 1100 described above with reference to FIGS. 1, 3, 4, and 11 and provide storage and compute services (e.g., cloud services) to a client device 1220 that is in communication with the system 1210 through a network 1230. In the illustrative embodiment, the system 1210, in operation, performs efficient compression of data using multiple hash tables that are associated with hashes of different sizes of string prefixes (e.g., the number of symbols in each string prefix). The illustrative system 1210 includes a set of managed nodes 1260 in communication with each other and with an orchestrator server 1240. Each managed node 1260 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). Further, each managed node 1260 may be established, defined, or "spun up" by the orchestrator server 1240 at the time a workload is to be assigned to the managed node 1260 or at any other time, and may exist regardless of whether any workloads are presently assigned to the managed node 1260. In the illustrative embodiment, the set of managed nodes 1260 includes managed nodes 1250, 1252, and 1254. While three managed nodes 1260 are shown in the set, it should be understood that in other embodiments, the set may include a different number of managed nodes 1260 (e.g., tens of thousands). The orchestrator server 1240 may support a cloud operating environment, such as OpenStack, and assign workloads to the managed nodes 1260 for execution.

The managed nodes 1260 may execute the workloads, such as in virtual machines or containers, on behalf of a user of the client device 1220. Managed nodes 1260 executing respective workloads may issue separate requests to read data and/or write data from or to one or other resources available in the system 1210 (e.g., physical storage resources 205-1, one or more physical memory resources 205-3, etc.). To reduce the amount of data transmitted between the resources in the system 1210, the data may be compressed (e.g., by a resource of a managed node 1260) prior to transmission, and decompressed (e.g., by another resource of a managed node 1260) after receipt of the data.

In the illustrative embodiment, in operation, a managed node 1260 may compress an input stream (e.g., an input file) using an Lempel-Ziv based compression scheme that is modified to produce, for each position in the input stream, multiple hashes based on different string prefixes (e.g., a hash produced as a function of the first five symbols starting at the present position, another hash produced as a function of the first four symbols starting at the present position, and another hash produced as a function of the first three symbols starting at the present position). By producing hashes based on more symbols in a string prefix than in typical systems (e.g., five symbols instead of three symbols), the managed node 1260 populates a hash table with hashes that include more information about the strings from which they were produced, leading to fewer false matches (e.g., hash collisions) and fewer pointers to follow when searching for a string at a previous position in the input stream that may match a string at the present position in the input stream. Further, by still producing hashes based on smaller string prefixes (e.g., three symbols and four symbols), the managed node 1260 reduces the likelihood of missing possible matches with smaller strings (e.g., matching the first three or four symbols of "AAABA" with "AAABC" when the hashes based on five symbol prefixes would not indicate these potential matches). As such, the managed node 1260 greatly increases the speed of the compression process while maintaining a high level of compression.

Figure 13:
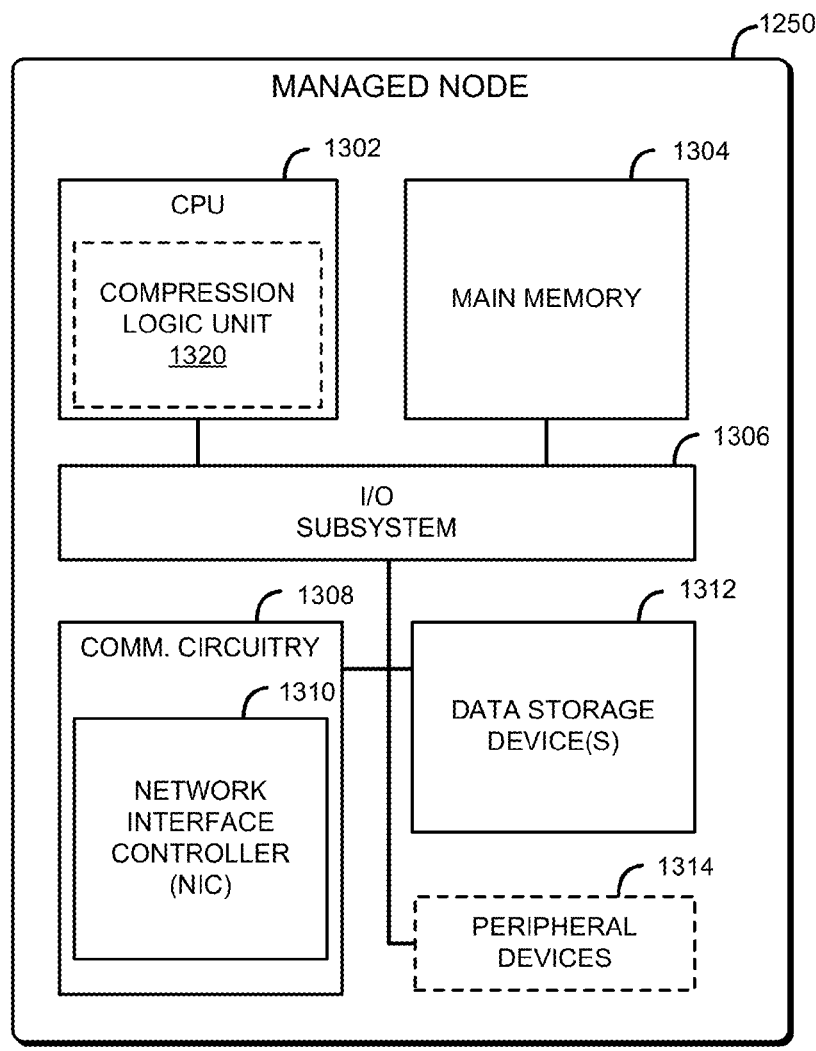
FIG. 13 is a simplified block diagram of at least one embodiment of a managed node of the system of FIG. 12.

Referring now to FIG. 13, the managed node 1250 in the set of managed nodes 1260 may be embodied as any type of compute device capable of performing the functions described herein, including decompressing data, compressing data, reading data, writing data, transmitting data, and performing workloads. For example, the managed node 1250 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative managed node 1250 includes a central processing unit (CPU) 1302, a main memory 1304, an input/output (I/O) subsystem 1306, communication circuitry 1308, and one or more data storage devices 1312. Of course, in other embodiments, the managed node 1250 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor capable of performing the functions described herein. As such, the CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. In the illustrative embodiment, the CPU 1302 may include a specialized compression logic unit 1320, which may be embodied as any circuitry or device, such as an FPGA, an ASIC, or co-processor, capable of offloading, from the other components of the CPU 1302, the compression of data using multiple hash tables. As discussed above, the managed node 1250 may include resources distributed across multiple sleds and in such embodiments, the CPU 1302 may include portions thereof located on the same sled or different sled.

The main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation, such as uncompressed input data, hash table data, spill table data, compressed output data, operating systems, applications, programs, libraries, and drivers. The managed node 1250 may include resources distributed across multiple sleds and in such embodiments, the main memory 1304 may include portions thereof located on the same sled or different sled.

The I/O subsystem 1306 may be embodied as circuitry and/or components to facilitate input/output operations with the CPU 1302, the main memory 1304, and other components of the managed node 1250. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the managed node 1250, on a single integrated circuit chip.

The communication circuitry 1308 may be embodied as any communication circuit, device, or collection thereof, capable of enabling communications over the network 1230 between the managed node 1250 and another compute device (e.g., the orchestrator server 1240 and/or one or more other managed nodes 1260). The communication circuitry 1308 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughter-cards, network interface cards, controller chips, chipsets, or other devices that may be used by the managed node 1250 to connect with another compute device (e.g., the orchestrator server 1240 and/or physical resources of one or more managed nodes 1260). In some embodiments, the NIC 1310 may be embodied as part of a system-on-a-chip (SoC) that includes one or more processors, or included on a multichip package that also contains one or more processors. In some embodiments, the NIC 1310 may include a processor (not shown) local to the NIC 1310. In such embodiments, the local processor of the NIC 1310 may be capable of performing one or more of the functions of the CPU 1302 described herein. As discussed above, the managed node 1250 may include resources distributed across multiple sleds and in such embodiments, the communication circuitry 1308 may include portions thereof located on the same sled or different sled.

The one or more illustrative data storage devices 1312, may be embodied as any type of devices configured for short-term or long-term storage of data such as, for example, solid-state drives (SSDs), hard disk drives, memory cards, and/or other memory devices and circuits. Each data storage device 1312 may include a system partition that stores data and firmware code for the data storage device 1312. Each data storage device 1312 may also include an operating system partition that stores data files and executables for an operating system. In the illustrative embodiment, each data storage device 1312 includes non-volatile memory. Non-volatile memory may be embodied as any type of data storage capable of storing data in a persistent manner (even if power is interrupted to the non-volatile memory). For example, in the illustrative embodiment, the non-volatile memory is embodied as Flash memory (e.g., NAND memory or NOR memory). In other embodiments, the non-volatile memory may be embodied as any combination of memory devices that use chalcogenide phase change material (e.g., chalcogenide glass), or other types of byte-addressable, write-in-place non-volatile memory, ferroelectric transistor random-access memory (FeTRAM), nanowire-based non-volatile memory, phase change memory (PCM), memory that incorporates memristor technology, magnetoresistive random-access memory (MRAM) or Spin Transfer Torque (STT)-MRAM, multi-threshold level NAND memory, a resistive memory, anti-ferroelectric memory, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

Additionally, the managed node 1250 may include one or more peripheral devices 1314. Such peripheral devices 1314 may include any type of peripheral device commonly found in a compute device such as a display, speakers, a mouse, a keyboard, and/or other input/output devices, interface devices, and/or other peripheral devices.

The client device 1220, the orchestrator server 1240, and the other managed nodes 1260 may have components similar to those described in FIG. 13. The description of those components of the managed node 1250 is equally applicable to the description of components of the client device 1220, the orchestrator server 1240, and the other managed nodes 1260 and is not repeated herein for clarity of the description. Further, it should be appreciated that any of the client device 1220, the orchestrator server 1240, and the other managed nodes 1260 may include other components, sub-components, and devices commonly found in a computing device, which are not discussed above in reference to the managed node 1250 and not discussed herein for clarity of the description.

As described above, the client device 1220, the orchestrator server 1240 and the managed nodes 1260 are illustratively in communication via the network 1230, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (Wi-MAX), etc.), digital subscriber line (DSL) networks, cable networks (e.g., coaxial networks, fiber networks, etc.), or any combination thereof.

Figure 14:
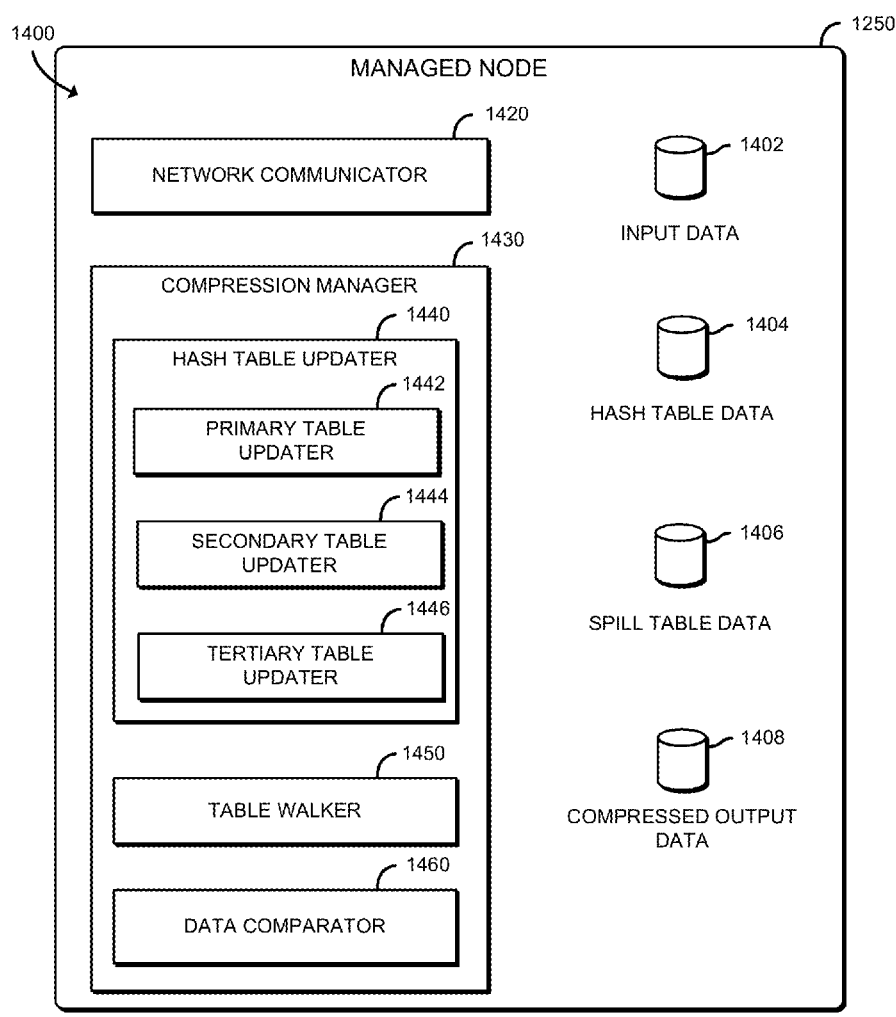
FIG. 14 is a simplified block diagram of at least one embodiment of an environment that may be established by a managed node of FIGS. 12 and 13.

Referring now to FIG. 14, in the illustrative embodiment, the managed node 1250 may establish an environment 1400 during operation. The illustrative environment 1400 includes a network communicator 1420 and a compression manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, compression manager circuitry 1430, etc.). It should be appreciated that, in such embodiments, one or more of the network communicator circuitry 1420 or the compression manager circuitry 1430 may form a portion of one or more of the CPU 1302 the compression logic unit 1320, the communication circuitry 1308, the main memory 1304, the I/O subsystem 1306, and/or other components of the managed node 1250. In the illustrative embodiment, the environment 1400 includes input data 1402 which may be embodied as any data, such as an input stream (e.g., an input file), that has not yet been compressed pursuant to the multiple hash table compression scheme described herein. The data may have been received from another device (e.g., the client device 1220, the orchestrator server 1240, one or more resources of another managed node 1260) or generated by the present managed node 1250. As described herein, each unit of data in the input data 1402 is referred to as a symbol for the purposes of the multiple hash table compression scheme. Each symbol may be embodied as a byte or another quantity of bits, depending on the particular embodiment. However, in the illustrative embodiment, each symbol is embodied as a byte. A sequence of symbols is referred to as a string and a string prefix defines a subset of the string, starting at the first symbol and including a predefined number of additional consecutive symbols. As such, for the string "ABCDEFG", a string prefix having a size of five would be "ABCDE", similarly, a string prefix having a size of four would be "ABCD", a string prefix having a size of three would be "ABC", and so on.

The environment 1400, in the illustrative embodiment, additionally includes hash table data 1404 which may be embodied as any data indicative of a structure in which hashes produced from string prefixes of different sizes for each position in the input data 1402 are stored in corresponding hash tables (e.g., a primary hash table for hashes based on string prefixes of five symbols, a secondary hash table for hashes based on string prefixes of four symbols, and a tertiary hash table for hashes based on string prefixes of three symbols). The hashes in the hash tables are associated with pointers (e.g., locations) of the beginnings of the strings in the input data 1402. Each hash is smaller in size (e.g., in the number of bits) than the combined sizes (e.g., total number of bits) of the symbols from which the hashes were produced. As such, hash collisions may occur, in which different strings of symbols may be referenced in connection with the same hash in the hash table data 1404. However, the likelihood of hash collisions for hashes based on larger string prefixes is lower than the likelihood of hash collisions for hashes based on smaller string prefixes.

Additionally, the environment 1400 includes spill table data 1406, which may be embodied as any data indicative of pointers to strings that did not fit within a set amount of space available in a hash table. In the illustrative embodiment, for a given hash, twenty pointers to strings may be stored in a primary hash table data 1404 for hashes based on five symbol string prefixes, with the most recently produced pointer being in a first position and previously produced pointers occupying subsequent positions. Any additional pointers (e.g., those produced even earlier) are evicted to the spill table data 1406, as described herein. In the illustrative embodiment, hashes from other hash tables (e.g., a secondary hash table for hashes based on four symbol string prefixes and a tertiary hash table for hashes based on three symbol string prefixes) may be replaced by new ones, without being evicted to a spill table. The illustrative environment 1400 additionally includes compressed output data 1408 which may be embodied as a compressed form of the input data 1402, produced by the managed node 1250 as a result of performing the multiple hash table compression scheme on the input data 1402.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the managed node 1250. To do so, the network communicator 1420 is configured to receive and process data packets from one system or computing device (e.g., the orchestrator server 1240, a managed node 1260, etc.) and to prepare and send data packets to another computing device or system (e.g., another managed node 1260). Accordingly, in some embodiments, at least a portion of the functionality of the network communicator 1420 may be performed by the communication circuitry 1308, and, in the illustrative embodiment, by the NIC 1310.

The compression manager 1430, which may be embodied as hardware, firmware, software, virtualized hardware, emulated architecture, and/or a combination thereof as discussed above, is configured to manage the compression of the input data 1402 to produce the compressed output data 1408 using multiple hash tables (e.g., in the hash table data 1404). To do so, in the illustrative embodiment, the compression manager 1430 includes a hash table updater 1440, a table walker 1450, and a data comparator 1460. The hash table updater 1440, in the illustrative embodiment, is configured to produce multiple hashes for each position in the input data 1402 by performing a hash function on string prefixes of different sizes that all start at the same position (e.g., the present position) in the input data 1402. The hash table updater 1440 stores the present position in association with each of the produced hashes in the corresponding hash tables in the hash table data 1404 (e.g., a hash based on a five symbol string prefix in the hash table for hashes based on five symbol string prefixes, a hash based on a four symbol string prefix in the hash table for hashes based on four symbol string prefixes, etc.). To do so, in the illustrative embodiment, the hash table updater 1440 includes a primary table updater 1442, a secondary table updater 1444, and a tertiary table updater 1446.

The primary table updater 1442, in the illustrative embodiment, performs a hash function on a five symbol string prefix that starts at the symbol at the present position in the input data 1402 and includes four additional consecutive symbols. Additionally, the primary table updater 1442 stores the produced hash in a primary hash table in the hash table data 1404, in association with a pointer to the present position. In the illustrative embodiment, the primary table updater 1442 shifts any existing pointers to subsequent positions (e.g., from the first position to the second position, from the second position to the third position, etc.) and stores the new pointer in the first position. Further, the primary table updater 1442 may evict one or more other pointers already stored in association with the hash to the spill table data 1406, such as if the number of existing pointers satisfies a predefined threshold (e.g., twenty existing pointers associated with the hash).

Similarly, the secondary table updater 1444, in the illustrative embodiment, performs the hash function on a four symbol string prefix that starts at the symbol at the present position and includes three additional consecutive symbols. In doing so, the secondary table updater 1444 may apply the same hash function used by the primary table updater 1442 but provide a zeroed out symbol (e.g., a byte with a value of zero) as the missing fifth symbol for the input to the hash function. In other embodiments, the secondary table updater 1444 may apply a different hash function than the one used by the primary table updater 1442. The secondary table updater 1444 then stores the produced hash in a secondary hash table in the hash table data 1404, in association with a pointer to the present position. In doing so, the secondary table updater 1444 may shift any existing pointers to subsequent positions, if any subsequent positions are available, and store the new pointer in the first position. In the illustrative embodiment, the secondary hash table has a smaller capacity for pointers to be stored in association with any given hash (e.g., up to four pointers per hash, up to two pointers per hash, or only one pointer per hash, depending on the embodiment), as compared to the primary hash table, and excess pointers are not saved in the spill table data 1406. The tertiary table updater 1446, in the illustrative embodiment, performs operations similar to the secondary table updater 1444, except the tertiary table updater 1446 produces hashes for string prefixes of three symbols (e.g., rather than string prefixes of four symbols) and saves the hashes in a tertiary hash table, which is similar to the secondary hash table described above.

The table walker 1450, in the illustrative embodiment, is configured to request the set of pointers for each hash associated with the present position from the hash table updater 1440 or directly from the hash table data 1404 and "walk" (e.g., traverse) the set of pointers, which may also be referred to herein as a "pointer chain" or a "hash chain", by obtaining the pointer in the first position for the hash, and passing the pointer to the data comparator 1460, which, in the illustrative embodiment, is configured to compare the string referenced by the pointer to the present symbol and any subsequent symbols to determine whether and how many consecutive symbols match. In some embodiments, table walker 1450 may initially send pointers associated with the five symbol prefix hash to the data comparator 1460 (e.g., as these are more likely to result in a longer matching string than the pointers associated with the hashes for smaller string prefixes) and, in response to a determination that no matching string was found, send pointers associated with the hashes for the smaller string prefixes (e.g., the four symbol prefix and the three symbol prefix) to find potential matching strings. In other embodiments, the table walker 1450 may send the pointers from the hash tables in a different order.

If a matching string is found, the compression manager 1430 outputs a reference to the longest matching string found, in place of the symbol itself (referred to herein as "literal"). In some embodiments, if string matches are found at multiple pointer locations for a given position, then the compression manager 1430 will choose the best result based on a scoring function (e.g., having the longest match length and/or the shortest distance). Otherwise, the compression manager 1430 outputs the symbol itself. Regardless, the compression manager 1430 then advances to a subsequent position in the input data 1402 to perform the above operations again.

It should be appreciated that each of the hash table updater 1440, the table walker 1450, and the data comparator 1460 may be separately embodied as hardware, firmware, software, virtualized hardware, emulated architecture, and/or a combination thereof and may be distributed across multiple sleds. For example, the hash table updater 1440 may be embodied as a hardware component, while the table walker 1450 and the data comparator 1460 are embodied as virtualized hardware components or as some other combination of hardware, firmware, software, virtualized hardware, emulated architecture, and/or a combination thereof.

Figure 15:
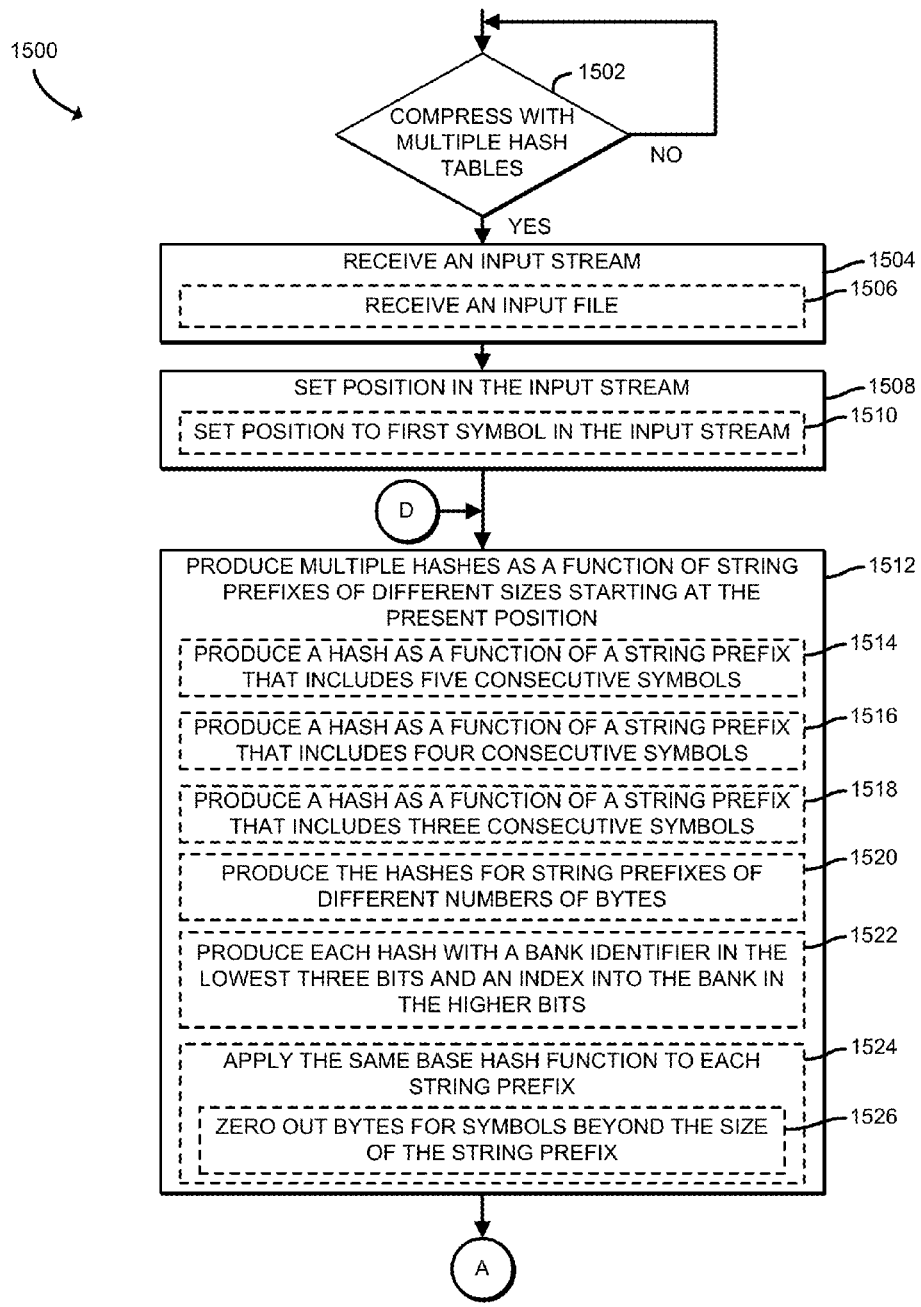
FIGS. 15-17 are a simplified flow diagram of at least one embodiment of a method for efficiently compressing data with multiple hash tables that may be performed by a managed node of FIGS. 12 and 13.

Referring now to FIG. 15, in use, the managed node 1250 may execute a method 1500 for efficiently compressing data using multiple hash tables. The method 1500 begins with block 1502, in which the managed node 1250 determines whether to compress data using multiple hash tables. In the illustrative embodiment, the managed node 1250 may determine to compress data using multiple hash tables if the managed node 1250 is powered on and has detected the presence of the compression logic unit 1320. In other embodiments, the managed node 1250 may determine to compress data using multiple hash tables based on other factors (e.g., if the managed node 1250 has been assigned a workload that includes compression tasks, etc.). Regardless, in response to a determination to compress data using multiple hash tables, the method 1500 advances to block 1504 in which the managed node 1250 receives an input stream (e.g., the input data 1402), such as from another resource of the managed node 1250 (e.g., from a physical compute resource 205-4, a physical storage resource 205-1) or from another compute device (e.g., the orchestrator server 1240, the client device 1220, etc.). The input stream may be embodied as an input file, as indicated in block 1506. Subsequently, the managed node 1250 sets a present position in the input stream (e.g., the input data 1402), as indicated in block 1508. In doing so, in the illustrative embodiment, the managed node 1250 sets the present position to the first symbol in the input stream, as indicated in block 1510.

In block 1512, the managed node 1250 produces multiple hashes as a function of string prefixes of different sizes starting at the present position. In doing so, in the illustrative embodiment, the managed node 1250 produces a hash as a function of a string prefix that includes five consecutive symbols (e.g., a prefix "ABCDE" of a string), as indicated in block 1514. Additionally, in the illustrative embodiment, the managed node 1250 produces another hash as a function of a string prefix that includes four consecutive symbols (e.g., "ABCD"), as indicated in block 1516. Further, in the illustrative embodiment, the managed node 1250 produces another hash as a function of a string prefix that includes three consecutive symbols (e.g., "ABC"), as indicated in block 1518. In doing so, the managed node 1250, in the illustrative embodiment, produces the hashes for string prefixes of different numbers of bytes (e.g., each symbol is equal to a number of bytes, such as one byte), as indicated in block 1520. In the illustrative embodiment, the managed node 1250 produces each hash with a bank identifier in the lowest three bits (e.g., the three least significant bits) and an index into the identified bank in the higher bits (e.g., the more significant bits), as indicated in block 1522. For example, the managed node 1250 may split each hash table into eight banks, with the lowest three bits of a hash representing an identifier of the bank into which a pointer should be stored, and the higher bits representing an index (e.g., an entry number) in the identified bank. As indicated in block 1524, in the illustrative embodiment, the managed node 1250 applies the same hash function to each string prefix (e.g., from blocks 1514, 1516, 1518), except, in doing so, the managed node 1250 zeroes out bytes for symbols beyond the size of the string prefix, as indicated in block 1526. For example, for a hash function designed to operate on five byte string prefixes, the managed node 1250 may append two bytes of 0x00 to a string prefix that only contains three bytes. In other embodiments, the managed node 1250 may use different hash functions for each string prefix length and/or may produce hashes that do not include a bank identifier. Subsequently, the method 1500 advances to block 1528 of FIG. 16, in which the managed node 1250 searches for a matching string of symbols in the input stream (e.g., the input data 1402) using the produced hashes.

Figure 16:
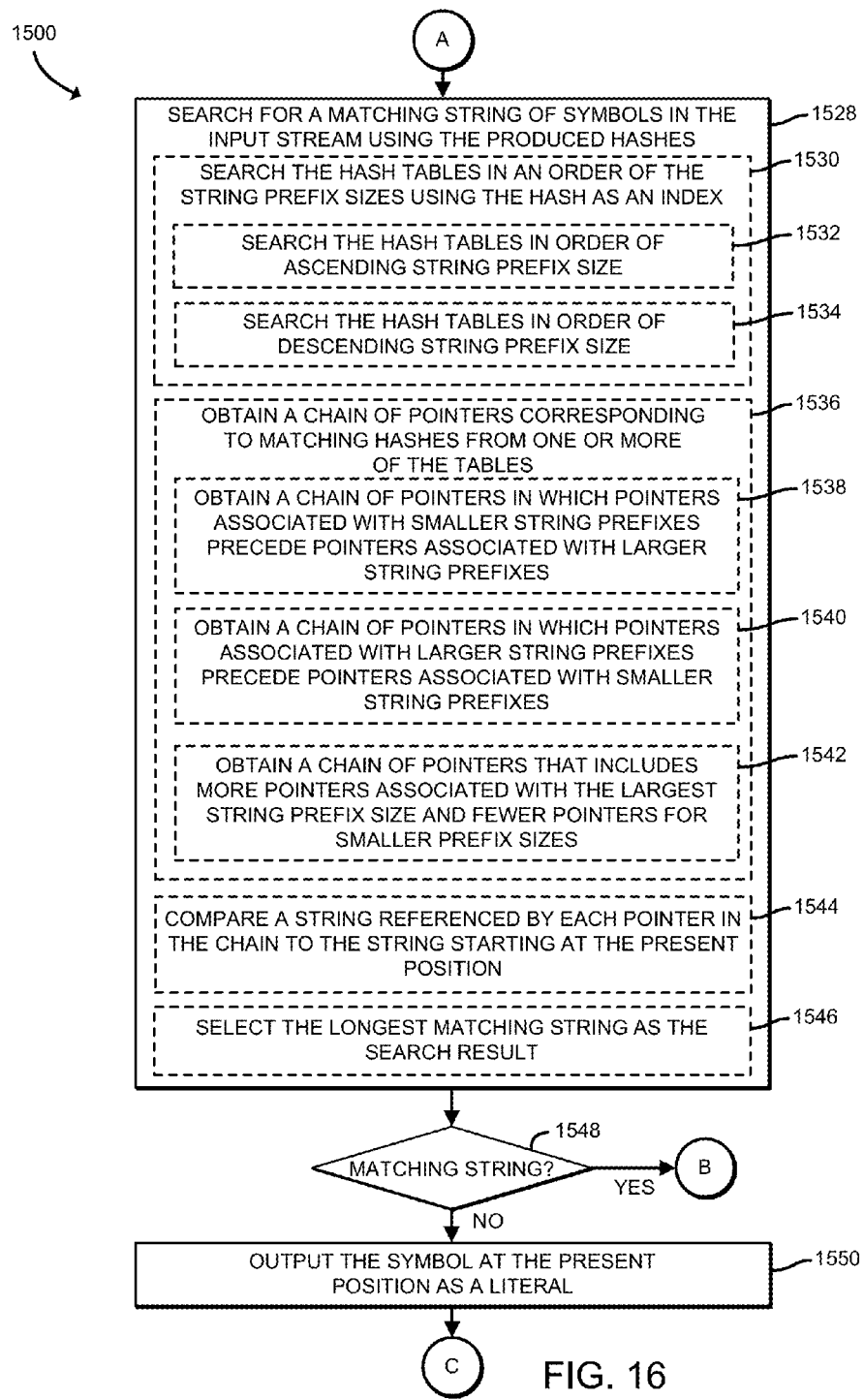

Referring now to FIG. 16, and as indicated in block 1530, the managed node 1250 may search the hash tables in an order of the string prefix sizes using each hash (e.g., from block 1512) as an index into the corresponding hash table (e.g., in the hash table data 1404). As indicated in block 1532, the managed node 1250 may search the hash tables in order of ascending string prefix size (e.g., first searching the tertiary hash table for data previously stored in association with the hash produced from the three symbol prefix, then searching the secondary hash table for data previously stored in association with the hash produced from the four symbol prefix, then searching the primary hash table for data previously stored in association with the hash produced from the five symbol prefix). Alternatively, the managed node 1250 may search the hash tables in order of descending string prefix size, as indicated in block 1534. In block 1536, the managed node 1250 obtains a chain of pointers corresponding to matching hashes (e.g., entries corresponding to the produced hashes in which pointers have been previously stored) in one or more of the hash tables. In doing so, the managed node 1250, in the illustrative embodiment, may obtain a chain of pointers in which pointers associated with small string prefixes precede pointers associated with larger string prefixes (e.g., any pointers to locations in the input stream associated with the hashes produced from the three symbol string prefix and/or the four symbol prefix precede any pointers associated with the hash produced from the five symbol string prefix), as indicated in block 1538. Alternatively, the managed node 1250 may obtain a chain of pointers in which pointers associated with larger string prefixes precede pointers associated with small string prefixes, as indicated in block 1540.

In the illustrative embodiment, the managed node 1250 may obtain a chain of pointers that includes more pointers associated with the largest string prefix size (e.g., five symbols) and fewer pointers for smaller prefix sizes (e.g., three and/or four symbols), as indicated in block 1542. As described previously, some pointers for the hashes based on the five symbol prefixes may be stored in the spill table data 1406, so the set of pointers associated with the five symbol prefixes could potentially include pointers stored in an entry of the primary hash table (e.g., in the hash table data 1404)

such as up to twenty pointers, and additional pointers from the spill table data 1406. In block 1544, the managed node 1250 compares a string reference by each pointer in the chain (e.g., from block 1536) to the string starting at the present position to determine whether and how many of the symbols match between the two strings. Additionally, in the illustrative embodiment, if there are multiple matching strings, the managed node 1250 selects the longest matching string as the search result, as indicated in block 1546. In some embodiments, the managed node 1250 may apply a scoring function to select a matching string as a function of the length of the matching string (e.g., longer is better) and distance of the matching string from the present position (e.g., closer is better). Subsequently, the method 1500 advances to block 1548, in which the managed node 1250 determines whether a matching string was found in block 1528. If not, the method 1500 advances to block 1550, in which the managed node 1250 outputs (e.g., in the compressed output data 1408) the symbol at the present position as a literal value (e.g., the symbol itself, rather than a reference to a previously encountered string in the input stream). Otherwise, the method 1500 advances to block 1552 of FIG. 17, in which the managed node 1250 outputs (e.g., in the compressed output data 1408) a reference to the matching string.

Figure 17:
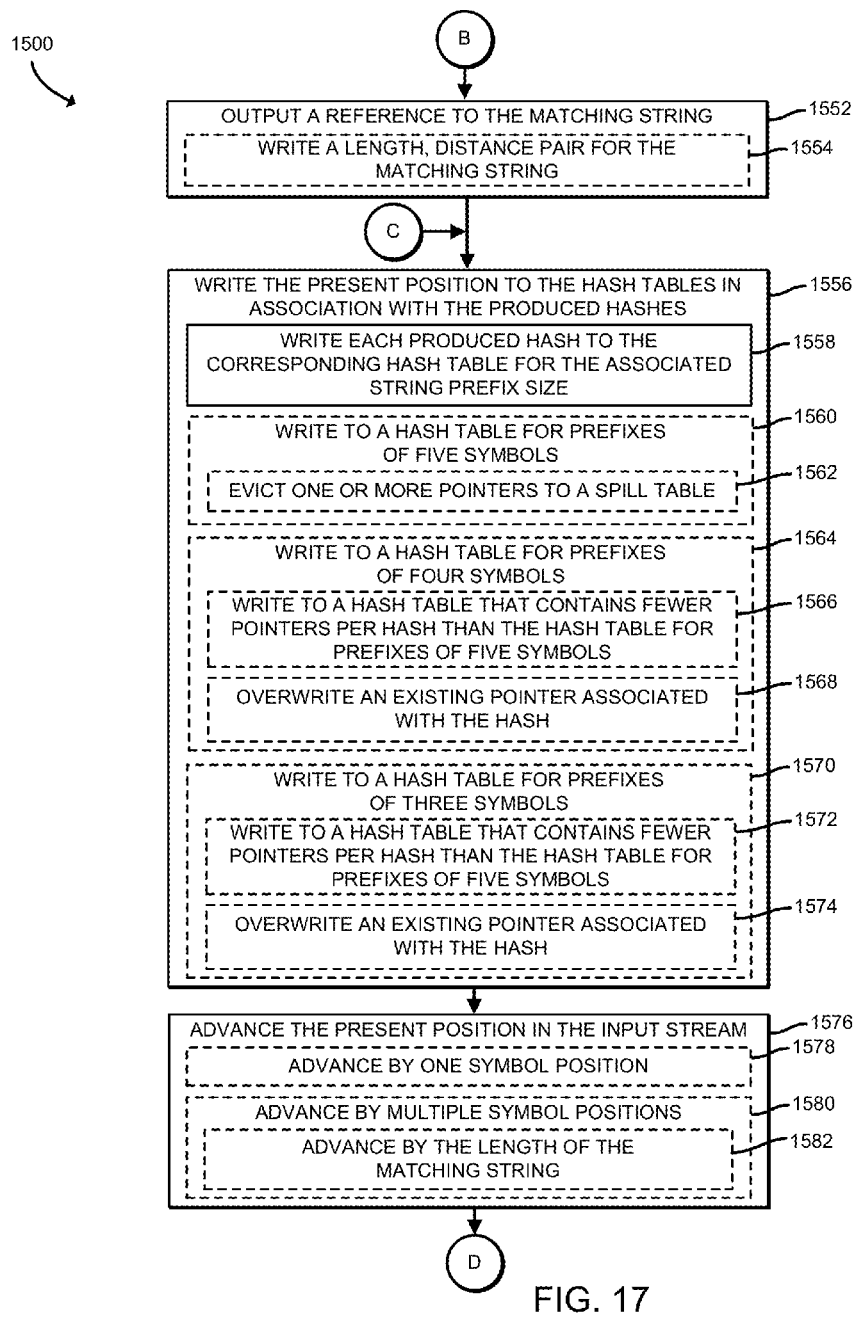

Referring now to FIG. 17, in outputting a reference to the matching string, the managed node 1250 may write a length and distance pair for the matching string. In the illustrative embodiment, the length and distance pair defines a length of symbols to be copied from a previously found string in the input stream, and the distance backwards from the present position, where the matching string begins, as indicated in block 1554. Regardless of what the managed node 1250 output to the compressed output data 1408, the method 1500 subsequently advances to block 1556, in which the managed node 1250 writes the present position to the hash tables in association with the produced hashes (e.g., the hashes produced in block 1512). In block 1558, the managed node 1250 writes each produced hash to the corresponding hash table for the associated string prefix size. As indicated in block 1560, the managed node 1250, in the illustrative embodiment, writes to a hash table for prefixes of five symbols (e.g., the primary hash table). In doing so, and as indicated in block 1562, the managed node 1250 may evict one or more pointers to a spill table (e.g., the spill table data 1406) as discussed above. The managed node 1250 may also write to a hash table for prefixes of four symbols (e.g., the secondary hash table), as indicated in block 1564. In doing so, the managed node 1250 may write to a hash table (e.g., the secondary hash table) that contains fewer pointers per hash than the hash table for prefixes of five symbols (e.g., the primary hash table), as indicated in block 1566. Additionally, in doing so, the managed node 1250 may overwrite an existing pointer associated with the produced hash, as indicated in block 1568. Similarly, as indicated in block 1570, the managed node 1250 may write to a hash table for prefixes of three symbols (e.g., the tertiary hash table). In doing so, the manage node 1250 may write to a hash table that contains fewer pointers per hash than the hash table for the prefixes of five symbols (e.g., the primary hash table), as indicated in block 1572. Additionally, in doing so, the managed node 1250 may overwrite an existing pointer associated with the produced hash, as indicated in block 1574.

Afterwards, in block 1576, the managed node 1250 advances the present position in the input stream (e.g., the input data 1402). In doing so, the managed node 1250 may advance by one symbol position, as indicated in block 1578. Alternatively, the managed node 1250 may advance by multiple symbol positions, as indicated in block 1580. In advancing by multiple symbol positions, the managed node 1250 may advance by the length of the matching string (e.g., the matching string found in block 1528), as indicated in block 1582. Subsequently, the method 1500 loops back to block 1512 to produce multiple hashes (e.g., one for each size of prefix) for the string starting at the new present position. While the string prefix sizes are described above as being five symbols, four symbols, and three symbols, it should be appreciated that, in other embodiments, prefix sizes may be different and there may be more or fewer than three different prefix sizes associated with the hash tables.

EXAMPLES

Illustrative examples of the technologies disclosed herein are provided below. An embodiment of the technologies may include any one or more, and any combination of, the examples described below.

Example 1 includes a compute device comprising one or more processors; and a memory having stored therein a plurality of instructions that, when executed by the one or more processors, cause the compute device to produce, for each of multiple string prefixes of different string prefix sizes, an associated hash, wherein each string prefix defines a set of consecutive symbols in a string that starts at a present position in an input stream of symbols; and write, to a different hash table for each string prefix size, a pointer to the present position in association with the associated hash, wherein each hash is usable as an index into the associated hash table to provide the present position of the string.

Example 2 includes the subject matter of Example 1, and wherein the plurality of instructions, when executed, further cause the compute device to search, with the produced hashes as indexes into the associated hash tables and in an order based on the string prefix sizes associated with the hashes, for a string at a previous position in the input stream that matches the string at the present position.

Example 3 includes the subject matter of any of Examples 1 and 2, and wherein the plurality of instructions, when executed, further cause the compute device to output, in response to an identification of a matched string, a reference to the matched string in a set of compressed output data.

Example 4 includes the subject matter of any of Examples 1-3, and wherein the plurality of instructions, when executed, further cause the compute device to output, in response to a determination that a matched string has not been identified, the symbol at the present position to a set of compressed output data.

Example 5 includes the subject matter of any of Examples 1-4, and wherein to search for a string at a previous position that matches the string at the present position comprises to obtain a chain of pointers from one or more of the hash tables; and compare the string referenced by each pointer in the chain of pointers to the string at the present position in the input stream.

Example 6 includes the subject matter of any of Examples 1-5, and wherein to obtain the chain of pointers comprises to obtain a chain of pointers that are ordered as a function of the associated string prefix sizes on which the associated hashes are based.

Example 7 includes the subject matter of any of Examples 1-6, and wherein the plurality of instructions, when executed, further cause the compute device to select, in response to a determination that multiple strings match the string at the present position, the longest matched string as the result of the search.

Example 8 includes the subject matter of any of Examples 1-7, and wherein to produce, for each of multiple string prefixes of different string prefix sizes, an associated hash comprises to produce a hash for each of a string prefix size of five symbols, a string prefix size of four symbols, and a string prefix size of three symbols.

Example 9 includes the subject matter of any of Examples 1-8, and wherein to produce, for each of multiple string prefixes of different string prefix sizes, an associated hash comprises to produce a hash for each of a string prefix size of five bytes, a string prefix size of four bytes, and a string prefix size of three bytes.

Example 10 includes the subject matter of any of Examples 1-9, and wherein to produce, for each of multiple string prefixes of different string prefix sizes, an associated hash comprises to produce a hash in which a lower subset of bits in the hash defines an identifier of a bank and a remainder of the bits in the hash define an index into the bank.

Example 11 includes the subject matter of any of Examples 1-10, and wherein to write, to a different hash table for each string prefix size, a pointer to the present position comprises to write a pointer to the present position to a first hash table for hashes based on string prefixes of five symbols, a second hash table for hashes based on string prefixes of four symbols, and a third hash table for hashes based on string prefixes of three symbols.

Example 12 includes the subject matter of any of Examples 1-11, and wherein to write a pointer to the first hash table comprises to evict one or more pointers from the first hash table to a spill table before the pointer to the present position is written to the first hash table.

Example 13 includes the subject matter of any of Examples 1-12, and wherein to write a pointer to the second hash table comprises to write to a second hash table that includes fewer pointers per hash than the first hash table.

Example 14 includes the subject matter of any of Examples 1-13, and wherein to write a pointer to the third hash table comprises to write to a third hash table that includes fewer pointers per hash than the first hash table.

Example 15 includes a method for compressing data with multiple hash tables, the method comprising producing, by a compute device and for each of multiple string prefixes of different string prefix sizes, an associated hash, wherein each string prefix defines a set of consecutive symbols in a string that starts at a present position in an input stream of symbols; and writing, by the compute device and to a different hash table for each string prefix size, a pointer to the present position in association with the associated hash, wherein each hash is usable as an index into the associated hash table to provide the present position of the string.

Example 16 includes the subject matter of Example 15, and further including searching, by the compute device and with the produced hashes as indexes into the associated hash tables and in an order based on the string prefix sizes associated with the hashes, for a string at a previous position in the input stream that matches the string at the present position.

Example 17 includes the subject matter of any of Examples 15 and 16, and further including outputting, by the compute device and in response to an identification of a matched string, a reference to the matched string in a set of compressed output data.

Example 18 includes the subject matter of any of Examples 15-17, and further including outputting, by the compute device and in response to a determination that a matched string has not been identified, the symbol at the present position to a set of compressed output data.

Example 19 includes the subject matter of any of Examples 15-18, and wherein searching for a string at a previous position that matches the string at the present position comprises obtaining, by the compute device, a chain of pointers from one or more of the hash tables; and comparing, by the compute device, the string referenced by each pointer in the chain of pointers to the string at the present position in the input stream.

Example 20 includes the subject matter of any of Examples 15-19, and wherein obtaining the chain of pointers comprises obtaining a chain of pointers that are ordered as a function of the associated string prefix sizes on which the associated hashes are based.

Example 21 includes the subject matter of any of Examples 15-20, and further including selecting, by the compute device and in response to a determination that multiple strings match the string at the present position, the longest matched string as the result of the search.

Example 22 includes the subject matter of any of Examples 15-21, and wherein producing, for each of multiple string prefixes of different string prefix sizes, an associated hash comprises producing a hash for each of a string prefix size of five symbols, a string prefix size of four symbols, and a string prefix size of three symbols.

Example 23 includes the subject matter of any of Examples 15-22, and wherein producing, for each of multiple string prefixes of different string prefix sizes, an associated hash comprises producing a hash for each of a string prefix size of five bytes, a string prefix size of four bytes, and a string prefix size of three bytes.

Example 24 includes the subject matter of any of Examples 15-23, and wherein producing, for each of multiple string prefixes of different string prefix sizes, an associated hash comprises producing a hash in which a lower subset of bits in the hash defines an identifier of a bank and a remainder of the bits in the hash define an index into the bank.

Example 25 includes the subject matter of any of Examples 15-24, and wherein writing, to a different hash table for each string prefix size, a pointer to the present position comprises writing a pointer to the present position to a first hash table for hashes based on string prefixes of five symbols, a second hash table for hashes based on string prefixes of four symbols, and a third hash table for hashes based on string prefixes of three symbols.

Example 26 includes the subject matter of any of Examples 15-25, and wherein writing a pointer to the first hash table comprises evicting one or more pointers from the first hash table to a spill table before the pointer to the present position is written to the first hash table.

Example 27 includes the subject matter of any of Examples 15-26, and wherein writing a pointer to the second hash table comprises writing to a second hash table that includes fewer pointers per hash than the first hash table.

Example 28 includes the subject matter of any of Examples 15-27, and wherein writing a pointer to the third hash table comprises writing to a third hash table that includes fewer pointers per hash than the first hash table.

Example 29 includes one or more machine-readable storage media comprising a plurality of instructions stored thereon that, in response to being executed, cause a compute device to perform the method of any of Examples 15-28.

Example 30 includes a compute device for compressing data with multiple hash tables, the compute device comprising one or more processors; one or more memory devices having stored therein a plurality of instructions that, when executed by the one or more processors, cause the compute device to perform the method of any of Examples 15-28.

Example 31 includes a compute device comprising means for producing, for each of multiple string prefixes of different string prefix sizes, an associated hash, wherein each string prefix defines a set of consecutive symbols in a string that starts at a present position in an input stream of symbols; and means for writing, to a different hash table for each string prefix size, a pointer to the present position in association with the associated hash, wherein each hash is usable as an index into the associated hash table to provide the present position of the string.

Example 32 includes the subject matter of Example 31, and further including means for searching, with the produced hashes as indexes into the associated hash tables and in an order based on the string prefix sizes associated with the hashes, for a string at a previous position in the input stream that matches the string at the present position.

Example 33 includes the subject matter of any of Examples 31 and 32, and further including means for outputting, in response to an identification of a matched string, a reference to the matched string in a set of compressed output data. 34 The compute device of claim 32, further comprising means for outputting, in response to a determination that a matched string has not been identified, the symbol at the present position to a set of compressed output data.

Example 35 includes the subject matter of any of Examples 31-34, and wherein the means for searching for a string at a previous position that matches the string at the present position comprises means for obtaining a chain of pointers from one or more of the hash tables; and means for comparing the string referenced by each pointer in the chain of pointers to the string at the present position in the input stream.

Example 36 includes the subject matter of any of Examples 31-35, and wherein the means for obtaining the chain of pointers comprises means for obtaining a chain of pointers that are ordered as a function of the associated string prefix sizes on which the associated hashes are based.

Example 37 includes the subject matter of any of Examples 31-36, and further including means for selecting, in response to a determination that multiple strings match the string at the present position, the longest matched string as the result of the search.

Example 38 includes the subject matter of any of Examples 31-37, and wherein the means for producing, for each of multiple string prefixes of different string prefix sizes, an associated hash comprises means for producing a hash for each of a string prefix size of five symbols, a string prefix size of four symbols, and a string prefix size of three symbols.

Example 39 includes the subject matter of any of Examples 31-38, and wherein the means for producing, for each of multiple string prefixes of different string prefix sizes, an associated hash comprises means for producing a hash for each of a string prefix size of five bytes, a string prefix size of four bytes, and a string prefix size of three bytes.

Example 40 includes the subject matter of any of Examples 31-39, and wherein the means for producing, for each of multiple string prefixes of different string prefix sizes, an associated hash comprises means for producing a hash in which a lower subset of bits in the hash defines an identifier of a bank and a remainder of the bits in the hash define an index into the bank.

Example 41 includes the subject matter of any of Examples 31-40, and wherein the means for writing, to a different hash table for each string prefix size, a pointer to the present position comprises means for writing a pointer to the present position to a first hash table for hashes based on string prefixes of five symbols, a second hash table for hashes based on string prefixes of four symbols, and a third hash table for hashes based on string prefixes of three symbols.

Example 42 includes the subject matter of any of Examples 31-41, and wherein the means for writing a pointer to the first hash table comprises means for evicting one or more pointers from the first hash table to a spill table before the pointer to the present position is written to the first hash table.

Example 43 includes the subject matter of any of Examples 31-42, and wherein the means for writing a pointer to the second hash table comprises means for writing to a second hash table that includes fewer pointers per hash than the first hash table.

Example 44 includes the subject matter of any of Examples 31-43, and wherein the means for writing a pointer to the third hash table comprises means for writing to a third hash table that includes fewer pointers per hash than the first hash table.

The invention claimed is:

1. A compute device comprising:
one or more processors; and
a memory having stored therein a plurality of instructions that, when executed by the one or more processors, cause the compute device to:
produce, for each of multiple string prefixes of different string prefix sizes, an associated hash, wherein each string prefix defines a set of consecutive symbols in a string that starts at a present position in an input stream of symbols; and
write, to a different hash table for each string prefix size, a pointer to the present position in association with the associated hash, wherein each hash is usable as an index into an associated hash table to provide the present position of the string.

2. The compute device of claim 1, wherein the plurality of instructions, when executed, further cause the compute device to search, with the associated hashes as indexes into the associated hash tables and in an order based on the string prefix sizes associated with the associated hashes, for a string at a previous position in the input stream that matches the string at the present position.

3. The compute device of claim 2, wherein the plurality of instructions, when executed, further cause the compute device to output, in response to an identification of a matched string, a reference to the matched string in a set of compressed output data.

4. The compute device of claim 3, wherein the plurality of instructions, when executed, further cause the compute device to select, in response to a determination that multiple strings match the string at the present position, the longest matched string as the result of the search.

5. The compute device of claim 2, wherein the plurality of instructions, when executed, further cause the compute device to output, in response to a determination that a matched string has not been identified, the symbol at the present position to a set of compressed output data.

6. The compute device of claim 2, wherein to search for a string at a previous position that matches the string at the present position comprises to:
   obtain a chain of pointers from one or more of the different hash tables; and
   compare the string referenced by each pointer in the chain of pointers to the string at the present position in the input stream.

7. The compute device of claim 6, wherein to obtain the chain of pointers comprises to obtain a chain of pointers that are ordered as a function of the associated string prefix sizes on which the associated hashes are based.

8. The compute device of claim 1, wherein to produce, for each of multiple string prefixes of different string prefix sizes, an associated hash comprises to produce a hash for each of a string prefix size of five symbols, a string prefix size of four symbols, and a string prefix size of three symbols.

9. The compute device of claim 1, wherein to produce, for each of multiple string prefixes of different string prefix sizes, the associated hash comprises to produce a hash for each of a string prefix size of five bytes, a string prefix size of four bytes, and a string prefix size of three bytes.

10. The compute device of claim 1, wherein to produce, for each of multiple string prefixes of different string prefix sizes, the associated hash comprises to produce a hash in which a lower subset of bits in the hash defines an identifier of a bank and a remainder of the bits in the hash define an index into the bank.

11. The compute device of claim 1, wherein to write, to a different hash table for each string prefix size, a pointer to the present position comprises to write a pointer to the present position to a first hash table for hashes based on string prefixes of five symbols, a second hash table for hashes based on string prefixes of four symbols, and a third hash table for hashes based on string prefixes of three symbols.

12. The compute device of claim 11, wherein to write a pointer to the first hash table comprises to evict one or more pointers from the first hash table to a spill table before the pointer to the present position is written to the first hash table.

13. One or more machine-readable storage media comprising a plurality of instructions stored thereon that, when executed by a compute device cause the compute device to:
   produce, for each of multiple string prefixes of different string prefix sizes, an associated hash, wherein each string prefix defines a set of consecutive symbols in a string that starts at a present position in an input stream of symbols; and
   write, to a different hash table for each string prefix size, a pointer to the present position in association with the associated hash, wherein each hash is usable as an index into an associated hash table to provide the present position of the string.

14. The one or more machine-readable storage media of claim 13, wherein the plurality of instructions, when executed, further cause the compute device to search, with the associated hashes as indexes into the associated hash tables and in an order based on the string prefix sizes associated with the hashes, for a string at a previous position in the input stream that matches the string at the present position.

15. The one or more machine-readable storage media of claim 14, wherein the plurality of instructions, when executed, further cause the compute device to output, in response to an identification of a matched string, a reference to the matched string in a set of compressed output data.

16. The one or more machine-readable storage media of claim 15, wherein the plurality of instructions, when executed, further cause the compute device to select, in response to a determination that multiple strings match the string at the present position, the longest matched string as the result of the search.

17. The one or more machine-readable storage media of claim 14, wherein the plurality of instructions, when executed, further cause the compute device to output, in response to a determination that a matched string has not been identified, the symbol at the present position to a set of compressed output data.

18. The one or more machine-readable storage media of claim 14, wherein to search for a string at a previous position that matches the string at the present position comprises to:
   obtain a chain of pointers from one or more of the different hash tables; and
   compare the string referenced by each pointer in the chain of pointers to the string at the present position in the input stream.

19. The one or more machine-readable storage media of claim 18, wherein to obtain the chain of pointers comprises to obtain a chain of pointers that are ordered as a function of the associated string prefix sizes on which the associated hashes are based.

20. The one or more machine-readable storage media of claim 13, wherein to produce, for each of multiple string prefixes of different string prefix sizes, an associated hash comprises to produce a hash for each of a string prefix size of five symbols, a string prefix size of four symbols, and a string prefix size of three symbols.

21. The one or more machine-readable storage media of claim 13, wherein to produce, for each of multiple string prefixes of different string prefix sizes, an associated hash comprises to produce a hash for each of a string prefix size of five bytes, a string prefix size of four bytes, and a string prefix size of three bytes.

22. The one or more machine-readable storage media of claim 13, wherein to produce, for each of multiple string prefixes of different string prefix sizes, an associated hash comprises to produce a hash in which a lower subset of bits in the hash defines an identifier of a bank and a remainder of the bits in the hash define an index into the bank.

23. The one or more machine-readable storage media of claim 13, wherein to write, to a different hash table for each string prefix size, a pointer to the present position comprises to write a pointer to the present position to a first hash table for hashes based on string prefixes of five symbols, a second hash table for hashes based on string prefixes of four symbols, and a third hash table for hashes based on string prefixes of three symbols.

24. A method for compressing data with multiple hash tables, the method comprising:
   producing, by a compute device and for each of multiple string prefixes of different string prefix sizes, an associated hash, wherein each string prefix defines a set of consecutive symbols in a string that starts at a present position in an input stream of symbols; and
   writing, by the compute device and to a different hash table for each string prefix size, a pointer to the present position in association with the associated hash, wherein each hash is usable as an index into an associated hash table to provide the present position of the string.

25. The method of claim 24, further comprising searching, by the compute device and with the associated hashes as indexes into the associated hash tables and in an order based on the string prefix sizes associated with the hashes, for a string at a previous position in the input stream that matches the string at the present position.

\* \* \* \* \*